United States Patent
Krauth et al.

(10) Patent No.: US 6,741,046 B1
(45) Date of Patent: May 25, 2004

(54) METHOD FOR STARTING A SENSOR- AND BRUSHLESS D.C. MOTOR

(75) Inventors: Wolfgang Krauth, Achern-Sasbachried (DE); Wolfgang Schwenk, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 10/130,147
(22) PCT Filed: Nov. 15, 2000
(86) PCT No.: PCT/DE00/04026
§ 371 (c)(1), (2), (4) Date: Sep. 19, 2002
(87) PCT Pub. No.: WO01/37420
PCT Pub. Date: May 25, 2001

(30) Foreign Application Priority Data

Nov. 17, 1999 (DE) .......................................... 199 55 247

(51) Int. Cl.⁷ ............................................... H02K 23/00
(52) U.S. Cl. ......................... 318/254; 318/439; 318/138
(58) Field of Search ................................ 318/701, 254, 318/138, 439, 700

(56) References Cited

U.S. PATENT DOCUMENTS

| | | | |
|---|---|---|---|
| 4,047,084 A | * 9/1977 | Ban | ........................... 318/254 |
| 5,198,733 A | 3/1993 | Wright | |
| 5,350,984 A | 9/1994 | Carobolante et al. | |
| 5,466,999 A | 11/1995 | Hutsell | |
| 5,489,831 A | * 2/1996 | Harris | ........................ 318/701 |

FOREIGN PATENT DOCUMENTS

| | | |
|---|---|---|
| DE | 39 40 568 | 4/1991 |
| FR | 2 590 423 | 5/1987 |
| JP | 1-308192 | 12/1989 |
| JP | 11-243698 | 9/1999 |
| JP | 2000-104981 | 4/2000 |

OTHER PUBLICATIONS

Patent Abstracts of Japan, vol. 14, No. 108 (E–896), Feb. 27, 1990.
Patent Abstracts of Japan, vol. 1999, No. 14, Dec. 22, 1999.
Patent Abstracts of Japan, vol. 2000, No. 7, Sep. 29, 2000.

* cited by examiner

Primary Examiner—Karen Masih
(74) Attorney, Agent, or Firm—Kenyon & Kenyon

(57) ABSTRACT

A method is for starting a sensorless and brushless direct current motor, the stator windings of which are supplied with power from a multiphase converter circuit. For starting the motor, it is first rotated into a defined starting position in an alignment operation through simultaneous energization of at least two phases. Then in a second phase, an energization state of the stator windings which is in the desired direction of rotation and provides sufficient torque is initiated, whereupon then the additional energization states of the corresponding phases follow cyclically, and the rotor is rotated in synchronization with the applied stator rotational field. The motor may be used in a motor vehicle and supplied with the battery voltage at the input terminals. In an example embodiment, the current supplied in the alignment is adjusted according to the battery voltage, and in addition, it is increased according to a specified waveform. This ensures reliable and rapid rotation without overshooting into the starting position.

13 Claims, 2 Drawing Sheets

_US 6,741,046 B1_

METHOD FOR STARTING A SENSOR- AND BRUSHLESS D.C. MOTOR

FIELD OF THE INVENTION

The present invention relates to a method of starting a sensorless and brushless direct current motor, in which the stator windings are supplied with power from a multiphase converter circuit.

BACKGROUND INFORMATION

German Published Patent Application No. 39 40 568.9 describes a circuit configuration for operating a multiphase synchronous motor on a direct current system. The phases are connected successively to the direct current voltage, and commutation switches are controlled according to the rotor position so that they overlap in time for commutation of successive phases, and at least one of the commutation switches is cycled in the commutation range so that the average current in the phase commuted up increases and the average current in the phase commuting down decreases. A lower switching power loss and noise reduction are achieved due to this overlapping and cycling of the switching signals in the commutation signal edges.

The position of the rotor in a sensorless and brushless direct current motor is purely coincidental at standstill and may not be determined. One possibility of starting up such a sensorless and brushless motor is to impose a stator rotational field via a starting oscillator. The frequency of the stator rotational field is adjusted so that the rotor is allowed to rotate with its inertia in a defined interval of time in synchronization with the imposed stator rotational field. This requires a complicated adjustment, e.g., when the mass inertia connected to the motor changes.

It is an object of the present invention to provide a reliable starting performance in the case of a multiphase sensorless and brushless direct current motor in a predetermined direction of rotation and within an overall predetermined allowed range of the direct current voltage feed applied at the converter circuit.

SUMMARY

The method according to the present invention for starting a sensorless and brushless direct current motor may provide the advantage that the rotor is pulled into a defined starting position within the shortest possible amount of time without any interfering vibration, and from this starting position it may be started quickly and reliably in the desired direction of rotation. The method according to the present invention is to a large extent insensitive to changes in the moment of inertia of the rotor, This may have the additional advantage that when used in fan applications, for example, the same direct current motor may be equipped with different fans without having to alter the control of the direct current motor.

In the method according to the present invention, the rotor is in principle first rotated into a defined starting position for startup in an alignment operation by simultaneously feeding power to at least two phases of the stator winding and then initiating an energization state of the stator windings which applies a sufficient torque in the desired direction of rotation, whereupon then the additional energization states of the corresponding phases follow in a cyclic pattern and the rotor is made to rotate in synchronization with the applied stator rotational field.

According to an example embodiment of the method according to the present invention, the second energization state of the stator windings is initiated as an energization state which applies a sufficient torque.

In an example embodiment of the method according to the present invention, the current and pulse width in pulse-width modulation of the current, which is supplied to the phases in energization of the two phases in the orientation operation are increased according to a certain curve.

According to another example embodiment, the curve with which the current and pulse width are increased is in the form of a ramp or a parabola. It is possible with this configuration of the alignment operation and the respective current, as provided for in another example embodiment, for the current and pulse width in pulse width modulation of the current to be varied according to the input direct current voltage applied at the converter circuit; e.g., in the case of a low direct current voltage, the current and pulse width are increased, and in the, case of a high direct current voltage, the current and pulse width are reduced. This may allow for adaptation to the strong fluctuations in battery voltage, which occur very often especially in a motor vehicle, and nevertheless permits reliable alignment and starting of the direct current motor.

This also may provide the advantage that the area of applications for such a motor is very broad because it has practically no sensitivity to changes in the mass inertia of the rotor. It may be possible for different loads to be attached to the motor.

In another example embodiment of the method according to the present invention, a suitable phase is analyzed, e.g., by detecting whether it has dropped below a commutation threshold, for commutation detection, e.g., by a zero crossing of the induced voltage of the non-energized phase.

In another example embodiment of the method according to the present invention, a microcontroller is provided for controlling and implementing the method, and a commutation interrupt is triggered when commutation is detected. Due to the interrupt routine thus called up, energization of the stator windings is switched to the next energization state.

In another example embodiment, the increase in the waveform of the current and pulse width and/or its dependence on the input direct current voltage of the converter circuit is stored in a read memory of the microcontroller. Therefore, once the waveform has been determined, it is available with each startup according to the input direct current voltage just applied in a suitably adapted form.

In another example embodiment of the method according to the present invention, this is applied to an external rotor motor, and permanent magnets are provided with alternating north and south poles on the internal perimeter in the bell of the external rotor motor. The method according to the present invention may of course also be used for internal rotor motors.

In another application of the method according to the present invention, it is used in a motor which is supplied with direct current power from a battery or the on-board electric system of a motor vehicle.

The method according to the present invention is explained in greater detail in the following description on the basis of an example embodiment of a sensorless and brushless direct current motor which is illustrated in the drawings.

BRIEF DESCRIPTION OF THE DRAWINGS

FIG. 5 illustrates three different diagrams.

DETAILED DESCRIPTION

Figure 1:
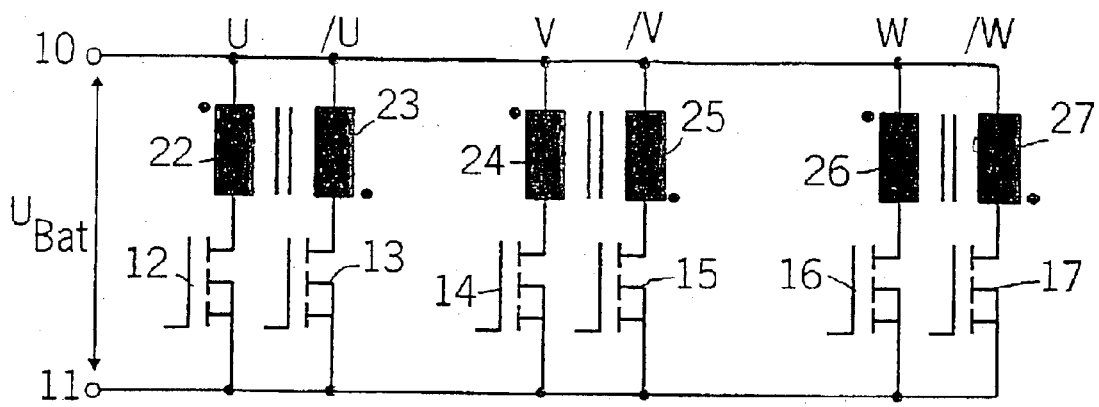
FIG. 1 is a schematic block diagram of a sensorless and brushless direct current motor including the output stage switches of a three-phase and six-pole converter circuit.
Figure 2:
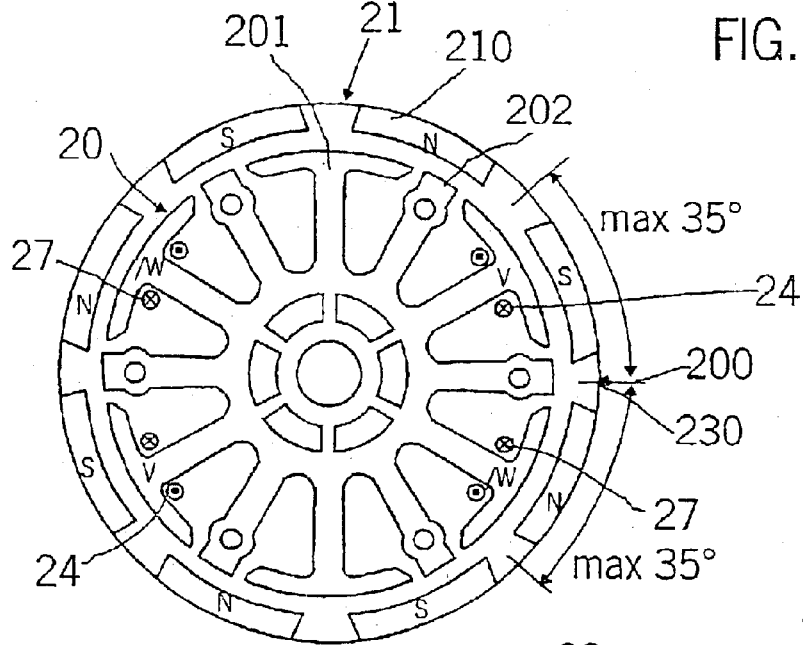
FIG. 2 is a sectional diagram of a brushless direct current motor including six stator poles and eight rotor magnets in the starting position together with the stator windings of the direct current motor thus energized.
Figure 3:
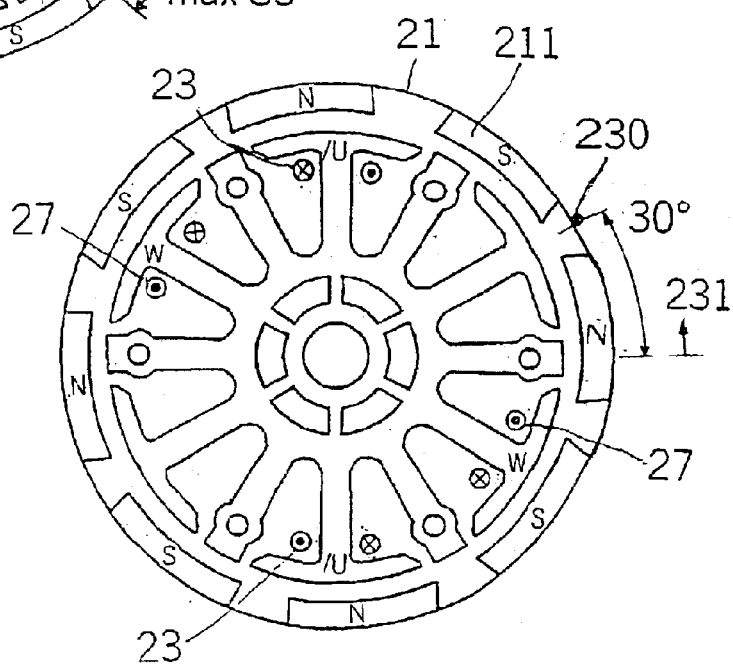
FIG. 3 illustrates the motor of the sectional diagram illustrated in FIG. 2 but in the state of acceleration including the energized windings for startup.

FIG. 1 is a schematic block diagram of the motor, which is illustrated in detail in the sectional diagram in FIGS. 2 and 3. A direct current voltage $U_{Bat}$ which is made available from the battery or the on-board electric system of a vehicle, for example, is available between two input terminals 10 and 11. Between these two poles there are six phases U, /U, V, /V, W and /W in parallel connection to terminals 10 and 11. The slash / indicates that respective phase U, V or W has been inverted. Phase U has a winding 22 and an electronic switch 12 in the form of a MOSFET transistor which represents the output stage of the converter. Phase /U has a similar configuration including a winding 23 in series with a power transistor 13. Phase V has winding 24 and power transistor 14 in series with it, and inverted phase /V has winding 25 in series with output transistor 15, which switches the latter winding. Similarly, phase W is composed of a winding 26 and power transistor 16 which switches it, and inverted phase /W is composed of a winding 27 and power transistor 17 which switches it. In the example embodiment of a motor illustrated in FIGS. 2 and 3, two windings connected in series are applied to each stator pole 201 for each phase. Thus, there are two windings on each armature head or stator pole 201.

FIGS. 2 and 3 illustrates an external rotor motor including a stator 20 and a peripheral bell 21 as an example embodiment of a sensorless and brushless direct current motor. Stator 20 has six armature heads or stator poles 201 to which are applied windings 22 through 27. Armature heads 201 are approximately T-shaped. An equal number of flux-carrying stator end loops 202 are provided between six armature heads 201. On the inside of bell 21, eight permanent magnets 210 are arranged with alternating north/south poles, forming the rotating drive part of the motor inside of bell 21. The direction of energization in the individual phases and the fact of energization per se are indicated in FIGS. 2 and 3 by dark dots and crosses inside circles as well as phase letters entered in respective stator head 201. The starting position is illustrated in FIG. 2 with dash 200 at the center between energized phases V and /W between the magnetic flux-carrying stator end loops. For a better understanding, a point 230 indicating direction of movement 231 and the corresponding position of bell 21 during the acceleration phase of the motor are entered on bell 21. In addition, FIG. 2 also illustrates an area of max. 45° up and down in the direction of rotation and in the opposite direction starting from starting position 200. In this range, it is possible to pull the motor illustrated into starting position 200. The position of point 230 illustrated in FIG. 3 has changed by 300 in comparison with the position illustrated in FIG. 2, i.e., bell 21 has moved 30° up counterclockwise in the direction of arrow 231.

Figure 5A:
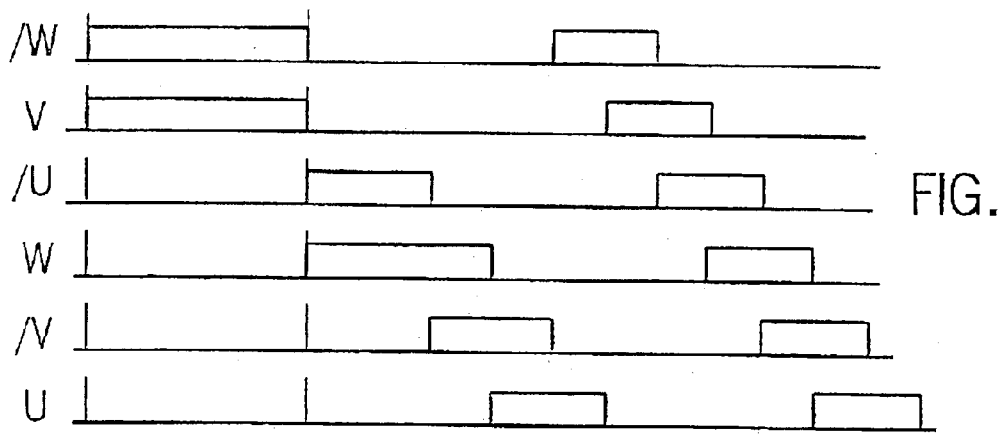
FIG. 5a schematically illustrates the energization states of the individual phases, first in the alignment operation and second in starting and in transition to the normal successive energization states.
Figure 5B:
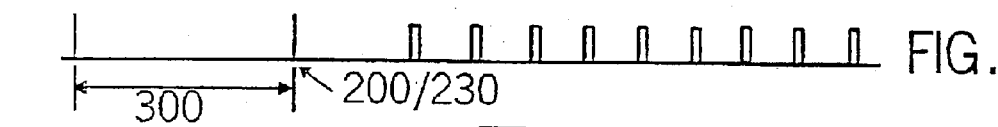
FIG. 5b illustrates the commutation pulses.
Figure 5C:
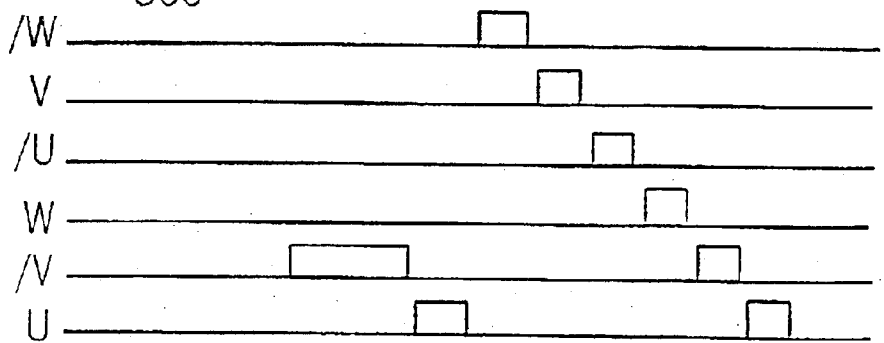
FIG. 5c schematically illustrates the various phases selected for commutation detection to generate from them the commutation pulses illustrated in FIG. 5b.

FIGS. 5a to 5c illustrate the various energization states during the starting operation, which is composed of an alignment operation 300 and the acceleration phase which follows after reaching starting position 200/230. The pulses illustrated in FIG. 5a are the control pulses applied at the gate of power transistors 12 through 17. They may be monitored, generated and triggered by a microcontroller. FIG. 5b illustrates the commutation pulses which are responsible for gate control of the power transistors, and FIG. 5c illustrates the individual pulses in phase selection which belong to the commutation pulses illustrated in FIG. 5b, and those which belong to the gate pulses of the individual phases illustrated in FIG. 5a.

Figure 4:
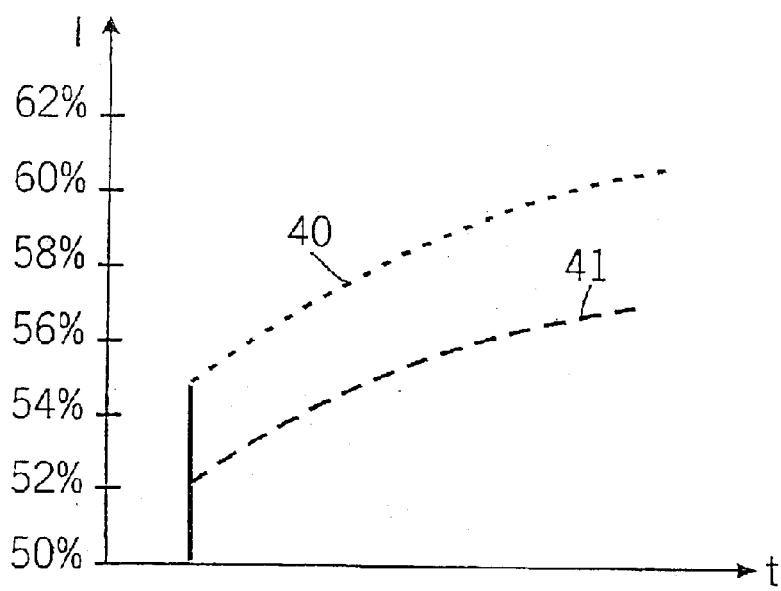
FIG. 4 illustrates the change in the waveform of the current over time with different input direct current voltages for the converter circuit, amperage I being given in percentage of pulse-width modulation.

FIG. 4 illustrates the percentage points of pulse-width modulation plotted against time t. The waveform with which the pulse width is varied in turn influences the current supplied to the various windings in the alignment phase. Waveform 40, illustrated with a dotted line, corresponds to the waveform used at the lowest direct current voltage applied at input 10 and 11 of the converter commutation, for example, and the, curve illustrated with dashes corresponds to the maximum direct current voltage $U_{Bat}$ applied at terminals 10 and 11. An adjustment to the input direct current voltage may be accomplished according to the operating range from maximal battery voltage $U_{Bat}$ of 16 V, for example, to minimal battery voltage of 9 V by applying a higher current I or a larger pulse-width ratio at a low voltage corresponding to curve 40 and reducing the current feed to the windings over time at an even lower voltage according to curve 41 when the applied battery voltage is higher.

According to the present invention, this method is composed of two phases. The first phase is an alignment phase 300 by which the motor is rotated into a starting position 200, and the second phase is an acceleration process starting from alignment or starting position 200. Rotor 21 of the direct current motor is rotated in alignment by simultaneously energizing two phases V and /W, for example, of the six phases. To do so, respective power transistors 14 and 17 are actuated at a defined pulse width corresponding to the voltage situation illustrated in FIG. 4. FIG. 2 illustrates the current directions which correspond to this state entered into the example embodiment illustrated, i.e., the direction of energization in winding 24 and in winding 27 is such that the resulting magnetic fluxes in the stator end loops between the correspondingly energized armature heads are canceled so that there is no magnetic flux in position 200 in aligned stator end loops 202. This is achieved through energization of gate pulses /W and V, as illustrated in FIG. 5a. After a certain period of time, which may be determined empirically, starting position 200 illustrated in FIG. 2 is reached. In FIGS. 5b and 5a, this starting position is marked with arrow 200/230. In the remaining course, according to the two middle plots illustrated in FIG. 5a, winding 23 of phase /U is energized by switching on transistor 13 and winding 26 of phase w is energized by switching on power transistor 16. In general terms, the energization state in the direction of rotation which delivers enough torque for starting is activated. In the example embodiment illustrated, this is the second energization state having the two abovementioned phases /U and W in direction of rotation 231. Due to this energization, rotor 21 is moved 30° out of starting position 200 illustrated in FIG. 2 or 200/230 illustrated in FIG. 5b, so that point 230 on rotor 21 is shifted 30° in the direction of arrow 231 illustrated in FIG. 3. It is thus accelerated in direction of rotation 231. According to this energization state, corresponding phase /U including winding 23 and phase W including winding 27 are illustrated in FIG. 3. Energization of these phases /U and W in the direction of energization indicated thus results in a shift of point 230 from starting position 200 into the position illustrated in FIG. 3. Rotor 21 is thus accelerated out of the starting position in direction of rotation 231 as illustrated in FIG. 3. At this time, phase /V is selected for commutation detection. When the stator tooth of phase V has been passed over by south pole 211 of rotor 21, the current has dropped below the commutation threshold and a commutation interrupt is triggered in the microcontroller. The interrupt routine thus triggered switches the energization to the next following state. After this period of time, rotor 21 then rotates in synchronization with the stator field. The required energization states and commutation pulses as well as the phase selection for commutation detection are illustrated schematically in FIGS. 5a to 5c in succession and in the proper chronological sequence. The additional energization states occurs successively according to the direction of rotation initiated and the desired rotational speed.

To prevent overshooting of rotor 21 beyond the desired starting position, indicated with 200 in FIG. 2, in alignment, current I or the pulse width in pulse-width modulation of the current which is used in energization of the phases in the alignment orientation, namely the current with which the power transistors of the two phases are actuated, has a specified, e.g., a ramp, form or a parabola form. At the same time, according to an example embodiment of the present invention, there may also be an adjustment to battery voltage $U_{Bat}$, such as that applied to terminals 10 and 11 of the converter circuit illustrated schematically in FIG. 1 and such as that in a vehicle, corresponding to the on-board voltage system. This adjustment is illustrated in FIG. 4, where at a high battery voltage of up to 16 V, for example, low curve 41 is applicable at which current I or the pulse width is reduced accordingly, and at a low voltage according to curve 40, e.g., at a battery voltage of 9 V, current I or the pulse width is increased accordingly. This ensures that after a defined period of time, rotor 21 will be pulled into the desired starting position 200 with its starting point 230 as illustrated in FIG. 2.

Thus according to the present invention, startup is implemented in two steps. First, within the shortest possible period of time, rotor 21 is pulled into a defined starting position without any interfering vibration and then it is started reliably and quickly in the desired direction of rotation starting from this position. This method is largely insensitive to the moment of inertia of rotor 21. This may provide the advantage that in fan applications, for example, the same motor may be equipped with different fans without having to alter the motor control.

What is claimed is:

1. A method of starting a sensorless and brushless direct current motor, comprising the steps of:
   supplying power to stator windings of the motor from a multiphase converter circuit;
   rotating a rotor into a defined starting position for startup first in an alignment operation through simultaneous energization of at least two phases of the stator windings; and
   initiating an energization state of the stator windings in a desired direction of rotation and providing sufficient torque, wherein additional energization states of corresponding phases follow cyclically, and the rotor is made to rotate in synchronization with the stator rotational field applied.

2. The method according to claim 1, further comprising the step of initiating a next but one energization state of the stator windings as the energization state that produces sufficient torque.

3. The method according to claim 1, further comprising the step of increasing, according to a specified waveform, a current and a pulse width of a pulse-width modulation of current supplied to the phases in energization of the two phases in the alignment operation.

4. The method according to claim 3, wherein the waveform includes one of a ramp and a parabola.

5. The method according to claim 3, further comprising the step of varying one of the current and the pulse width of the pulse-width modulation of the current according to an input direct current voltage applied at the converter circuit, wherein at a low direct current voltage, the one of the current and the pulse width is increased, and at a high direct current voltage, the one of the current and the pulse width is reduced.

6. The method according claim 1, further comprising the step of analyzing a suitable phase for commutation detection.

7. The method according to claim 6, wherein the commutation detection includes a zero crossing of an induced voltage of a non-energized phase.

8. The method according to claim 6, wherein the analyzing step includes the substep of detecting whether the suitable phase has dropped below a commutation threshold.

9. The method according to claim 1, further comprising the steps of:
   providing a microcontroller for controlling the method;
   triggering a commutation interrupt in a commutation detection; and
   switching, due to triggering the commutation interrupt, the energization of the stator windings to the next energization state.

10. The method according to claim 3, further comprising the steps of:
    providing a microcontroller for controlling the method;
    triggering a commutation interrupt in a commutation detection;
    switching, due to triggering the commutation interrupt, the energization of the stator windings to the next energization state;
    storing at least one of the increase in the waveform of the one of the current and the pulse width and a dependence on an input direct current voltage in a read memory of the microcontroller.

11. The method according to claim 1, wherein the motor includes an external-rotor motor.

12. The method according to claim 11, wherein the external-rotor motor includes permanent magnets provided in an alternating north-south polarity on an internal perimeter in a bell of the external-rotor motor.

13. The method according to claim 1, wherein the motor includes a motor supplied with direct current power from one of a battery and an on-board electric system of the motor vehicle.

* * * * *